June 30, 1970          D. S. HAMMETT          3,517,520

METHOD OF CONNECTING UNDERWATER PIPELINES

Filed June 20, 1968          3 Sheets-Sheet 1

INVENTOR:
DILLARD S. HAMMETT
BY: *Louis J. Bovasso*
HIS ATTORNEY

June 30, 1970 D. S. HAMMETT 3,517,520
METHOD OF CONNECTING UNDERWATER PIPELINES
Filed June 20, 1968 3 Sheets-Sheet 2

INVENTOR:
DILLARD S. HAMMETT
BY: *Louis J. Bovasso*
HIS ATTORNEY

June 30, 1970   D. S. HAMMETT   3,517,520
METHOD OF CONNECTING UNDERWATER PIPELINES
Filed June 20, 1968                    3 Sheets-Sheet 3

INVENTOR:
DILLARD S. HAMMETT
BY: *Louis J. Bovasso*
HIS ATTORNEY

United States Patent Office 3,517,520
Patented June 30, 1970

3,517,520
METHOD OF CONNECTING UNDERWATER PIPELINES
Dillard S. Hammett, Houston, Tex., assignor to Shell Oil Company, New York, N.Y., a corporation of New York
Filed June 20, 1968, Ser. No. 738,531
Int. Cl. F16l 1/00
U.S. Cl. 61—72.3                           1 Claim

ABSTRACT OF THE DISCLOSURE

Method of coupling a pair of pipelines underwater by extending the pipelines into overlapped position, cutting off the overlapped portion of one of the pipelines, aligning the free ends of the pipelines and joining the free ends together.

BACKGROUND OF THE INVENTION

Field of the invention

The present invention relates generally to underwater pipe laying and more specifically to a method of joining pipelines to underwater.

Description of the prior art

In laying pipelines underwater, it is difficult to place and join pipelines accurately. With the pipe sections slung from cranes or the like, the operation must either be carried out by divers, or remotely controlled from the surface, or the pipe sections can be pre-assembled on the surface and lowered into place. Numerous divers would be required to handle large pipes and would be working under difficult conditions, while remote controls would be practical only in shallow water, all of these systems being adversely affected by rough water or currents. Pre-assembling pipe sections on the surface would simplify the proper sealing of the joints, but lowering the assembled pipes onto a possible uneven surface below the water would, in most cases, break the joints and damage the pipes.

The discovery and recovery of offshore oil and gas deposits continues to be of increasing and vital interest. These activities have been in progress for many years, but primarily at relatively shallow depths. Deeper water operations have increased the need for reliable techniques for joining pipe at depths of 1,000 feet and deeper.

Since many of the underwater locations are at depths at which divers cannot operate or at which is is uneconomical to utilize divers, relatively complicated remote control and surveillance systems would have to be designed in order to produce satisfactory results with the conventionally used welding techniques. Such complicated remote control and surveillance equipment is both expensive to build and to maintain.

SUMMARY OF THE INVENTION

The invention relates to a method for connecting pipelines between offshore wells and offshore gathering stations or production systems by connecting a length of the pipeline from a well to a position marker, laying pipeline from the gathering station or production system into overlapped relation with the pipeline from the well, and then cutting the overlapped portion and remotely joining the ends of the pipelines on the ocean bottom.

DESCRIPTION OF THE PREFERRED EMBODIMENT

Figure 1:
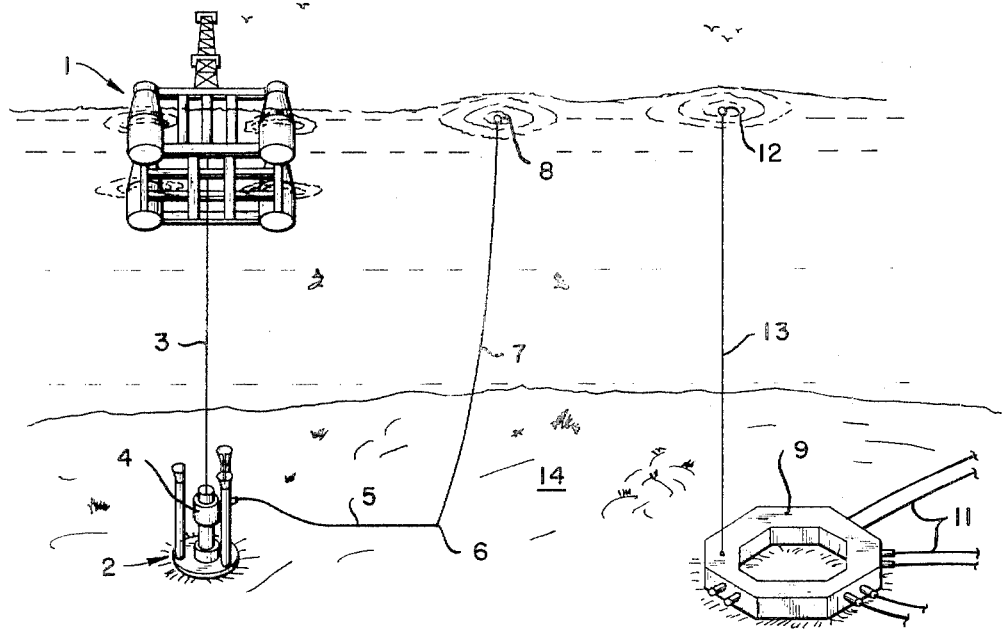
FIG. 1 is a diagrammatic synoptic representation of a preferred method of carrying out the concepts of the invention.

Referring to FIG. 1 a floating drilling rig, vessel or platform is shown in place after having completed an underwater producing well 2. Of course, the wellhead of well 2 could be either above or underwater, if desired. A marine conductor pipe 3 couples ring 1 to the wellhead 4 of well 2 as is well known in the art. After completion of the well, a portion of pipeline 5 is laid from the wellhead 4. The free end 6 of pipeline 5 is coupled to a guide line 7 attached to a buoy 8 in order to mark the underwater position of pipeline 5. Guide line 7 is of a particular length for subsequent operations as will be described hereinbelow.

Figure 2:
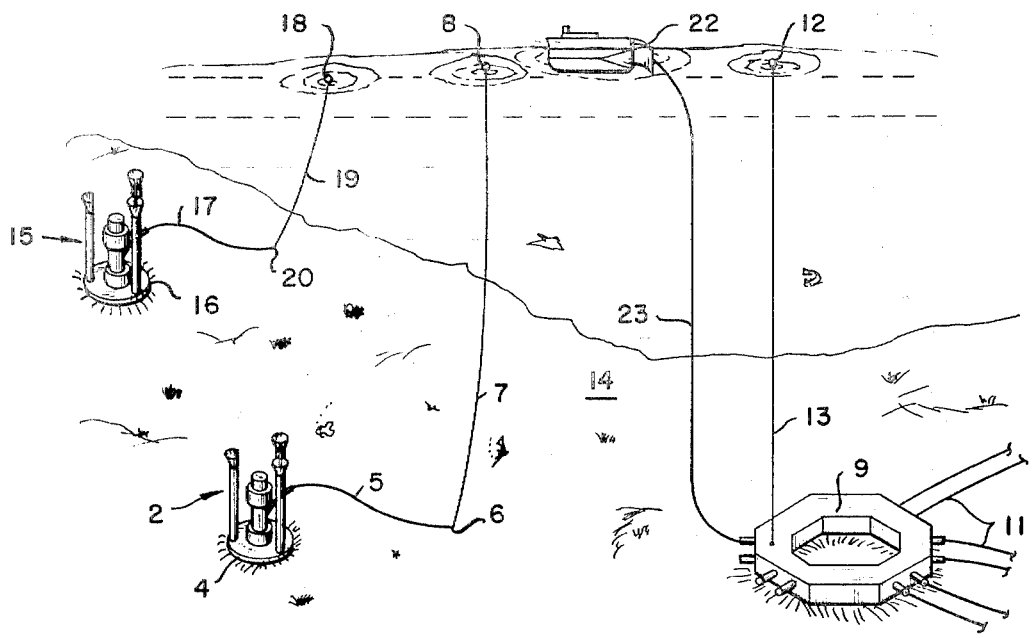
FIGS. 2 through 4 are diagrammatic synoptic representations of steps in carrying out the preferred method of FIG. 1.

The underwater position of a production system or underwater gathering station 9 is marked by means of a buoy 12 coupled to station 9 by means of guide line 13. Of course, other gathering lines 11 may, if desired, extend from gathering station 9 to other wells, one of which is shown in FIG. 2. As depicted in FIGS. 1 through 4, both gathering station 9 and wellhead 4 rest on the ocean bottom 14.

As illustrated in FIG. 2, several wells, such as well 2 and well 15, may be completed by means of floating rig 1 before the pipeline laying and connecting operation begins. Here, well 15 comprises a wellhead 16, a portion of a pipeline 17 extending from wellhead 16, and a buoy 18 coupled through guide line 19 to the free end 20 of pipeline 17.

In operation, referring more particularly to FIG. 2, a pipe lay barge 22 connects several wells during one offshore operation. Each well connecting operation consists briefly of lowering and connecting to the gathering station or production system and laying pipeline to the buoy marking the portion of pipeline laid previously from the wellhead. The pipe lay barge approach is approximately in line with the portion of the pipeline laid from the wellhead.

More specifically, barge 22 lowers a pipeline portion 23 which is remotely connected by means well known in the art to the production system or gathering station 9 adjacent buoy 12 as is well known in the art.

Figure 3:
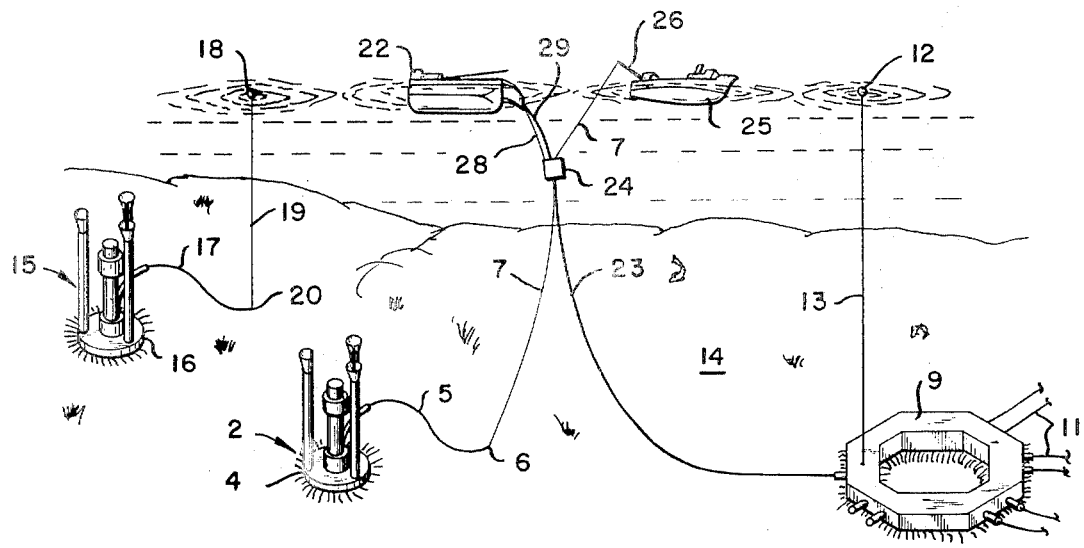
Figure 4:
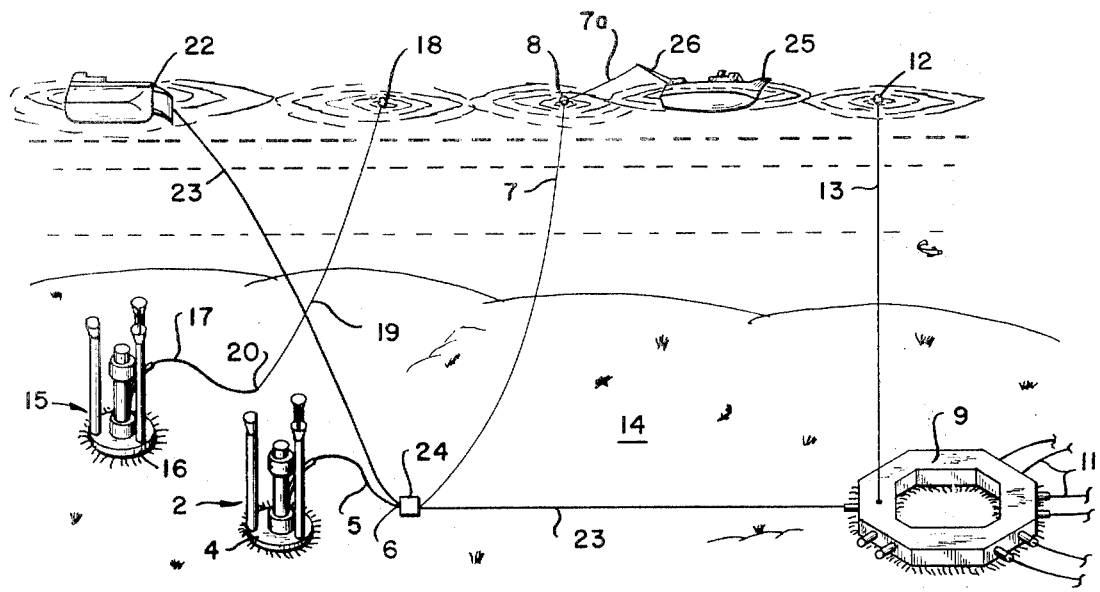
Figure 6:
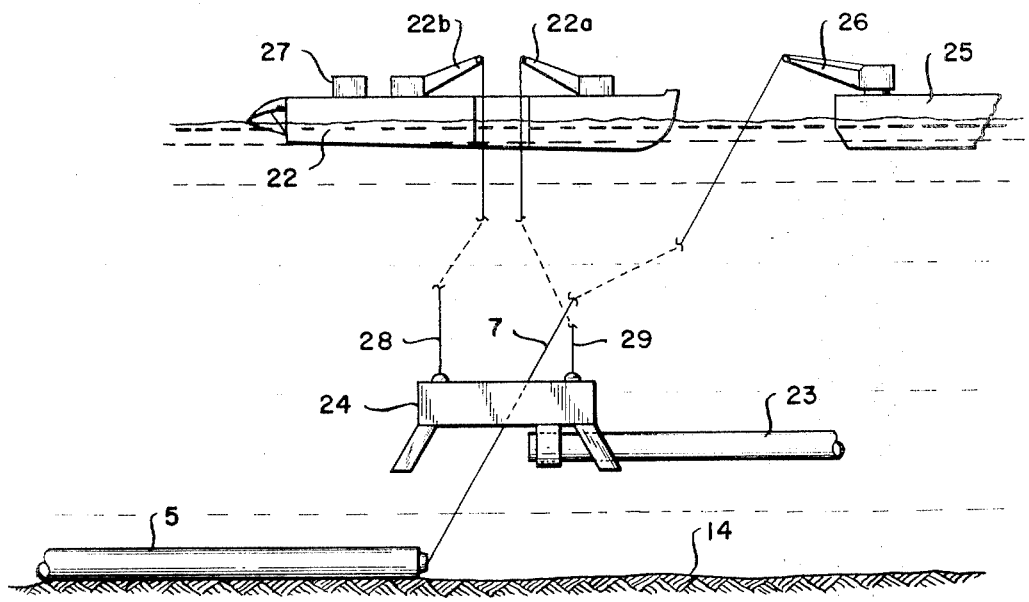

The pipe lay barge 22 extends the pipeline 23 adjacent to the buoy 8 marking the underwater position of pipeline 5. At this position, the barge 22 is used to prepare the free end of pipeline 23 for remote underwater connection to the free end 6 of pipeline 5. Suitable cutting, aligning and joining apparatus 24 is connected to the free end of pipeline 23 (FIGS. 3, 4, 6).

Figure 5:
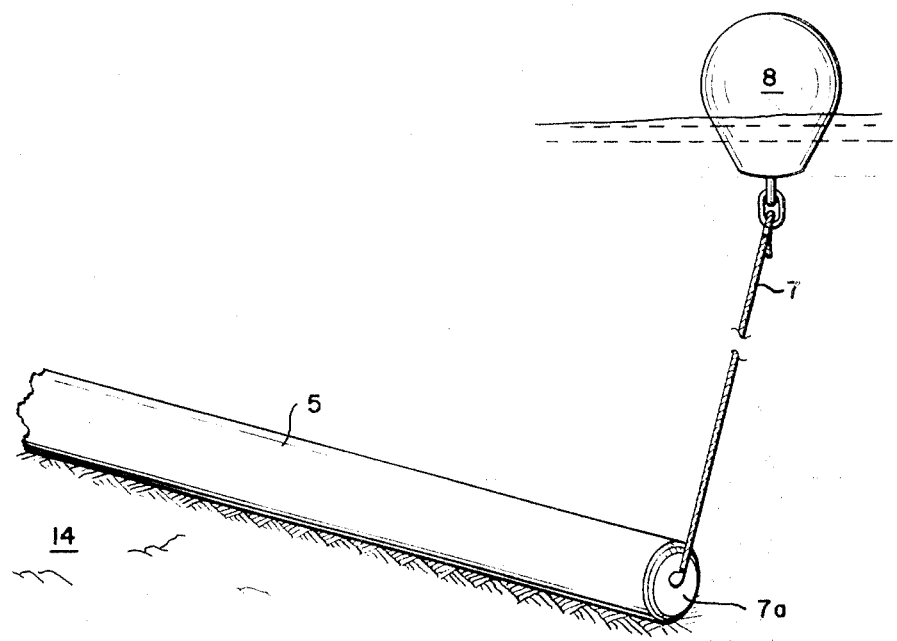
FIGS. 5 and 6 are detailed vertical views of a preferred method of lowering the apparatus for joining the pipelines in place on the sea bottom.

The apparatus disclosed in copending application Ser. No. 744,161, filed July 11, 1968, is the preferred technique of remotely joining the free ends of pipelines 5 and 23. As can best be seen in FIG. 5, a pipeline pig 7a is sent down the submerged pipeline 5 extending from wellhead 4. The pipeline 5 rests on the ocean bottom 14 and a closure such as a pig 7a is adapted to stop the end of pipeline 12 releasing a wire 7 having buoy 8 attached thereto as disclosed in a copending application to McCarron, Ser. No. 783,923, filed Dec. 16, 1968. The wire 7 is then picked up by an auxiliary vessel 25 and tensioned, as for example, by a block and counterweight 26 of a submerged buoy, to provide a straight-line guide to the submerged pipeline end 6. Barge 22 may be used for this purpose, if desired. However, it is not necessary to the invention to send such a pipeline pig through the submerged pipeline 5. Any device which accomplishes the required purpose, that of connecting the submerged pipe end to a buoy, may be attached at the time the pipeline is laid. For example, a simple weld cap with a ring would suffice for those cases in which the end of the submerged pipeline is to be cut off. The pig is required for those applications in which the need for a buoy could not be anticipated and in which there is no ready access to the end of the pipeline, such as the repair of broken or damaged pipelines.

The free end of pipeline 23 is then attached to the manipulating apparatus 24. The guide line 7 is passed through the apparatus 24. In this manner apparatus 24, coupled by guide lines 28 and 29 to winches 22a and 22b, respectively, can be lowered into juxtaposed position with pipeline 5 on the ocean bottom 14. Suitable control means 27 on barge 22 is coupled to apparatus 24 as disclosed in Ser. No. 744,161, filed July 11, 1968. Thus, as the hoist equipment of barge 22 lowers pipeline 23 concomitant with apparatus 24 into position over the wellhead portion of pipeline 5 at the ocean bottom 14, the apparatus 24 slides along the guide line 7. At this stage (FIG. 4), the two portions of pipelines 5 and 23 are parallel and overlap each other within the apparatus 24. By remote operation, as disclosed in copending application Ser. No. 744,161, filed July 11, 1968, the overlapped portion of at least one of the pipelines is cut off at a point wherein the cut-off end lies in substantially the same vertical plane as the free end of the remaining pipeline. For example, the end of pipeline 5 is cut off and the cut-off end is then aligned with the free end of the other pipeline 23 which has been prealigned in apparatus 24 and these ends are remotely joined thereby coupling both pipelines together.

Preferably, by remote operation, the wellhead pipeline 5 is gripped, cut, finished and moved into alignment with the free end of pipeline 23 where it is joined to pipeline 23 by remote means as described in detail in application Ser. No. 744,161, filed July 11, 1968.

The aligning, cutting and joining apparatus 24 is then released from the pipelines and retrieved by hoisting lines 28 and 29 as is well known in the art and a similar process is used to couple pipeline 17 to additional pipeline from barge 22. In this manner, a plurality of wells can be readily coupled to a gathering station or production system. Similarly, this method can also be applied to couple a production system to a gathering system or vice versa. Finally, the method disclosed herein can also be used to repair broken pipelines.

Various types of remote underwater coupling techniques may occur to one skilled in the art. For example, the resistance butt welding method disclosed in copending application Ser. No. 413,436, filed Nov. 24, 1965 readily lends itself to the method of the instant invention. Accordingly, the free end of pipeline 23 could be provided with the apparatus of Ser. No. 413,436 housed in a suitable container including means, such as a television camera, for viewing the degree of overlapping. In this manner, the overlapped portion could be cut by conventional means above the surface of the water, the free end of pipeline 23 prepared as described in Ser. No. 413,436 and the entire apparatus lowered into engagement and subsequent joining with pipeline 5. Further apparatus which may be used to align and join free ends of a pair of pipelines is disclosed in Pat. No. 3,204,417. Arc or gas welding may also be used to join together the pipelines 5 and 23; however, as discussed previously, the joining methods disclosed in application Ser. No. 744,161, filed July 11, 1968, are the preferred methods to be used with the instant invention.

While the invention has been disclosed specifically for use in joining pipelines together, the technique may equally be used for joining members of other shapes, for example, rods or plates.

I claim as my invention:

1. In a method for the connection of a pair of pipelines on the bottom of a body of water by use of pipe manipulating and joining apparatus for coupling the pipelines together whereby one of the pipelines terminates at a point on the bottom of said body of water, said method comprising the steps of:

extending a guide line from the terminal end of said first-mentioned pipeline to the surface of said body of water;

tensioning the guide line so as to provide accurate guidance to the underwater location of the first mentioned of said pipelines;

pulling the second mentioned of said pipelines adjacent the submerged location of the first mentioned of said pipelines at a point on the surface of said body of water;

attaching the second mentioned of said pipelines in a fixed, predetermined position on said manipulating and joining apparatus;

attaching the manipulating and joining apparatus to the tensioned guide line; and lowering the manipulating and joining apparatus via said tensioned guide line into overlapping relationship with the terminal end of the first mentioned of said pipelines.

References Cited

UNITED STATES PATENTS 3,431,739   3/1969   Richardson et al. _____ 61—72.3

OTHER REFERENCES

World Oil (publication) of Feb. 1, 1968, pp. 32–37.

JACOB SHAPIRO, Primary Examiner

U.S. Cl. X.R.

166—.6; 285—18